United States Patent [19]
van Weeren et al.

[11] Patent Number: 5,932,507
[45] Date of Patent: Aug. 3, 1999

[54] METHOD FOR PREVENTING LOW-TEMPERATURE DEGRADATION OF TETRAGONAL ZIRCONIA CONTAINING MATERIALS

[76] Inventors: Remco van Weeren, 6 Old Turnpike Rd., Oldwick, N.J. 08858; Jeffrey A. Goldacker, 907 Edgehill Rd., Findlay, Ohio 45840; Philip J. Whalen, 75 Edison Rd., Sparta, N.J. 07871

[21] Appl. No.: 09/026,228

[22] Filed: Feb. 19, 1998

[51] Int. Cl.$^6$ .................................................. C04B 35/10
[52] U.S. Cl. .......................... 501/105; 501/127; 264/66; 264/345
[58] Field of Search ..................... 501/103, 104, 501/105, 152, 127; 264/66, 345

[56] References Cited

U.S. PATENT DOCUMENTS 4,525,464  6/1985  Claussen et al. ...................... 501/103
4,853,353  8/1989  Whalen et al. ........................ 501/103

*Primary Examiner*—Michael Marcheschi
*Attorney, Agent, or Firm*—John A. Squires

[57] ABSTRACT

A ceramic body having a surface region containing tetragonal zirconia is sintered to at least 95% theoretical density at a temperature below about 1550 ° C. The surface region is then heat treated to reverse local stresses therein. Low temperature degradation in tetragonal zirconia, and materials containing tetragonal zirconia, is significantly inhibited. The heat treated ceramic is especially suited for use in structural components such as valves, engine housings, pistons (chambers) and the like which, during operation, are frequently exposed to temperatures ranging from room temperature to 500° C. for prolonged periods of time.

3 Claims, 3 Drawing Sheets

METHOD FOR PREVENTING LOW-TEMPERATURE DEGRADATION OF TETRAGONAL ZIRCONIA CONTAINING MATERIALS

BACKGROUND OF THE INVENTION

1. Field of the Invention

This invention relates to tetragonal zirconia containing materials; and more particularly to the a process for producing tetragonal zirconia containing ceramics wherein low temperature degradation is prevented.

2. Description of Prior Art

Ceramic materials used for structural applications are required to exhibit high hardness, strength and fracture toughness. One class of materials meeting these criteria are those containing zirconia as a constituent thereof. Zirconia imparts toughness to a material through a stress-induced phase transition from the metastable tetragonal to the equilibrium monoclinic phase. The transition is accompanied by a volume increase of approx. 5 percent, which changes the stress field around an advancing crack. The energy needed to propagate the crack is increased, therefore increasing the toughness.

In order to retain zirconia is its tetragonal form at room temperature after sintering, stabilizing oxides, such as $Y_2O_3$, $CeO_2$ or $MgO$, are added in amounts ranging from about 1–10 mol. %. The larger the grain size of the sintered material, the more unstable the tetragonal phase becomes. The stability of the tetragonal phase is the major factor determining the degree of toughening that the sintered zirconia-containing material will achieve. The toughness of such material increases as the stability of the tetragonal phase decreases.

Zirconia ceramics containing yttria as the stabilizing agent have been shown to have the highest strength of any material yet tested. The main drawback of these materials is the difficulty of controlling the metastable nature of the tetragonal phase. The same transformation which imparts high strength and toughness can cause a large reduction in strength when the material is exposed to temperatures in the range of RT to 500° C. for an extended period of time. Several detailed review papers have described the phenomena, and discussed a number of explanations. The exact mechanism for this degradation is reasonably well understood, although there are occasional examples of experimental results that seem not to support these theories. One such example is illustrated by the fact that the degradation can take place at room temperature, given enough time. Y-TZP material having a low (2.5 mol. %) yttria concentration was stored under office conditions for several years, after which spontaneous cracks occurred in a large number of pieces.

The mechanism that results in the strength degradation is well understood. At the surface of the part, the spontaneous transformation from tetragonal to monoclinic begins, and proceeds (perhaps autocatalytically) into the bulk of the material. This transformation causes cracks which obviously reduce the mechanical properties.

Degradation of tetragonal zirconia containing materials can be prevented by decreasing the metastability of the tetragonal phase. This is accomplished by either increasing the yttria content, or decreasing the grain size. Each of these methods has the disadvantage of reducing the high toughness of the material. Another method of preventing degradation of tetragonal zirconia containing materials is to effect change in the surface region as shown by U.S. Pat. No. 4,525,464 by Claussen et. al. The stability of the surface region is increased by increasing the surface stabilizer content. A zone of fully stabilized zirconia is created on the surface by sintering the material in a bed of stabilizing oxide. The stabilization of surfaces by this method is expensive, and is particularly difficult for complex parts or sharp corners.

There remains a need in the art for an economical method that prevents low temperature degradation of zirconia containing materials.

SUMMARY OF THE INVENTION

The present invention provides a method that is economical to practice and reliable in operation, and by way of which low temperature degradation in tetragonal zirconia, or in materials containing tetragonal zirconia is virtually eliminated.

Generally stated, the method of the invention represents an improvement on previous methods, which had required the step of sintering a zirconia body to at least 95% of theoretical density at a temperature below 1550° C. In accordance with such prior art methods, after sintering, a portion of the surface region was abraded, through machining or the like. This treatment was used to impart strain to the surface region. Following heat treatment, the surface region was recrystallized to small tetragonal zirconia crystals, which were very stable against transformation. Such protective treatment required the plastic deformation of the surface region before recrystallization. The content of the yttrium in the surface region was substantially the same as the average content in the ceramic body, and the surface region was covered with a thin layer of stable tetragonal grains.

It has been found, in accordance with the invention, that prevention of low temperature degradation in tetragonal zirconia ceramic containing alumina is readily accomplished if the same heat treatment is used after the sintering. The presence of alumina in the material results in a local stress reversal at the surface, eliminating the need for initially abrading the surface region, as would otherwise be the case for Y-TZP. The effect of the heat treatment is still dependent on the surface treatment, but works most favorable on polished surfaces.

The increased protection against low temperature degradation afforded by the process of the present invention makes ceramic materials produced thereby especially suited for use in structural components such as valves, engine housings, pistons (chambers) and the like which, during operation, are frequently exposed to temperatures ranging, from room temperature to 500° C. for prolonged periods of time.

BRIEF DESCRIPTION OF THE DRAWINGS

The invention will be more fully understood and further advantages will become apparent when reference is made to the following detailed description of the preferred embodiments of the invention and the accompanying drawings in which.

DETAILED DESCRIPTION OF THE INVENTION

Figure 1:
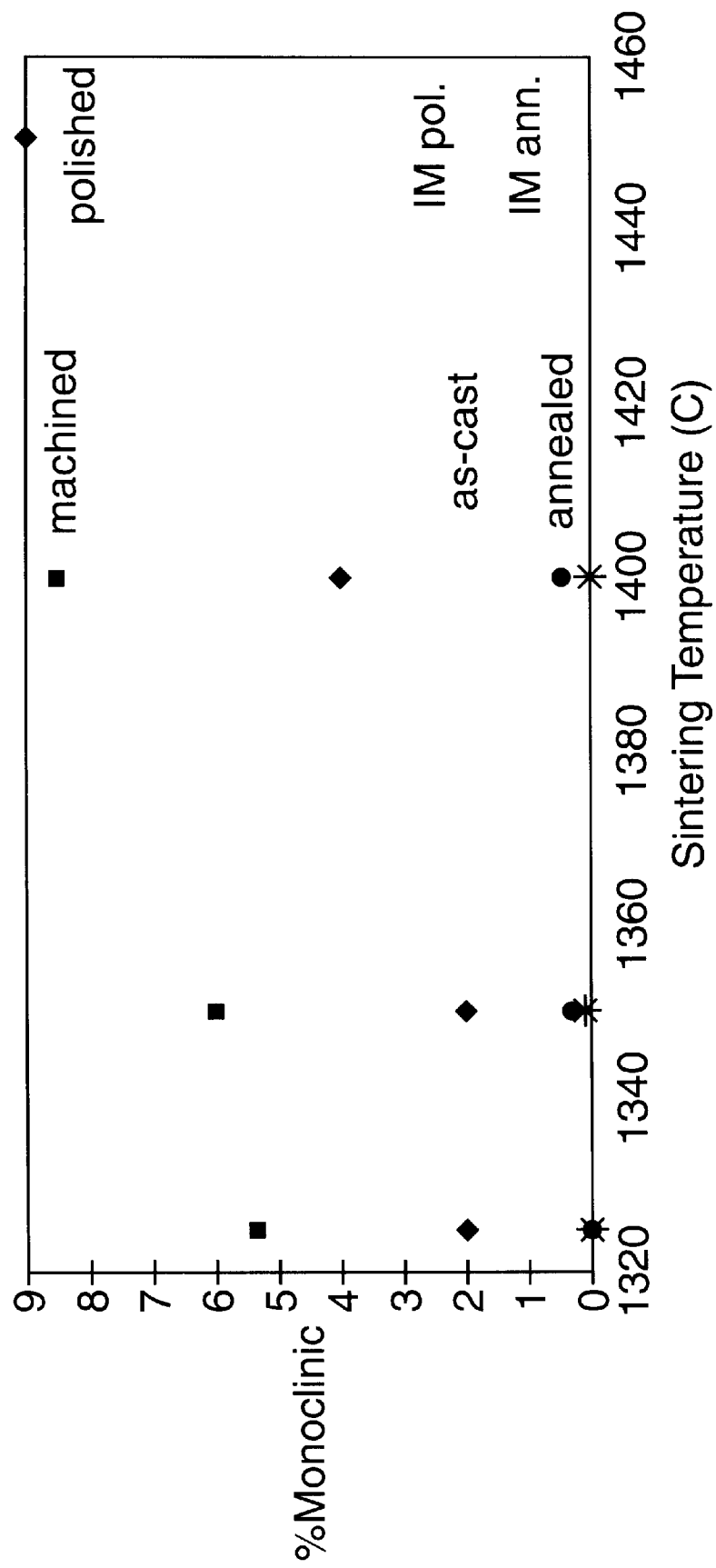
FIG. 1 is a graph showing the transformation from tetragonal to monoclinic as a function of sintering temperature.

Transformation toughened ceramics are formed by fabricating ceramic bodies containing significant volumes of tetragonal zirconia using stabilizing ions (i.e. $Y_2O_3$, $CeO_2$). Typically. a particular composition is selected to optimize the strength and toughness requirement, while adjusting the parameters which control the transformability of the tetragonal phase.

In accordance with the invention, a method is provided whereby the low temperature transformation to monoclinic is prevented within a surface region of the ceramic body, allowing a much greater range of toughness to be achieved in the bulk portion of the body, and allowing for much longer service times without the material degrading over time.

This technique is compatible with any material containing tetragonal zirconia stabilized with yttria and optionally, Ceria. Preferably, the ceramic body has a composition consisting essentially of 2–3 mol. % yttria, 0–6 wt. % ceria, and 5–40 wt. % alumina, the balance being zirconia plus incidental impurities.

Unlike previous methods for producing tetragonal zirconia containing materials, the heat treatment process of the present invention only requires a high temperature annealing step. It does not require any specific surface preparation, even though the invention is most preferably suited for polished surfaces.

Typically in heat treating, the ceramic body is heated at a heating rate of about 100–500° C./hr. to a temperature within a range of about 1000–1400° C. The temperature is maintained within the 1000–1400° C. range for a time ranging from about 0.5 hr. to 3.0 hrs. The body is then cooled to room temperature at a cooling rate of about 200–600° C./hr.

More specifically, in accordance with the invention, there is provided a preferred process which is compatible with the processing of most transformation toughened ceramics. The tetragonal zirconia containing material utilized in this process has a composition consisting essentially of 3 mol. % $Y_2O_3/ZrO_2$ sintered to at least 98% theoretical density at temperatures below 1550° C. In conducting the preferred process, the surface of the body can be machined, as-cast, as-molded, polished etc. The body is then heat treated by heating it at a rate of 200° C./hr, to a temperature of 1250° C.; maintaining the temperature at 1250° C. for 1 hr.; and cooling the body to room temperature at a cooling rate of 300° C./hr.

Too low an annealing temperature (below about 1000° C.) will not prevent the occurrence of low temperature degradation. On the other hand, too high an annealing temperature will cause the total microstructure to coarsen, reducing the overall mechanical properties, and decreasing the ability of the material to prevent spontaneous transformation. In addition, the upper limit of the heat treatment is markedly effected by the impurity level of components such as silica. At temperatures above 1400° C., the presence of silica at grain boundaries causes the redistribution of yttria in the body, with the result that the surface region becomes enriched in yttria at the expense of the bulk. This effect is highly undesirable; consequently, high purity material having low silica content is preferred.

The composition of the ceramic body is not limited to the 100% tetragonal embodiment as discussed. The treatment works equally well with compositions containing up to 20 wt. % alumina as strengthening agents. Materials containing tetragonal zirconia as a toughening agent in a ceramic matrix should also respond well to the surface treatment provided by the present process.

The following examples are presented to provide a more complete understanding of the invention. The specific techniques, conditions, materials proportions and reported data set forth to illustrate the principles and practice of the invention are exemplary and should not be construed as limiting the scope of the invention.

EXAMPLE 1

A cylinder of high purity 2.5 mol. % $Y_2O_3/ZrO_2$ was formed by isostatically pressing at 275 MPa followed by sintering at 1500° C. for 2 hrs. to achieve 99% density. After sintering the cylinder was sliced into 2 mm thick disks. The disks were then surface ground using a 220 mesh diamond wheel at 5200 surface feet per minute with a downfeed rate of 0.0102 mm/pass on one side. The other side was polished down to 1 micron diamond paste. Each sample was then annealed at a temperature ranging from 900° C. to 1500° C. for 2 hrs. The annealed pieces were placed in a low temperature furnace and aged for 20 hrs. at 200° C. X-ray diffraction was used to analyze the phase content of both surfaces of each piece after the low temperature age. The results are set forth below in Table I.

TABLE I

| Recrystallization | Percent Monoclinic On Aged Surfaces | |
|---|---|---|
| Temperature (°C) | Polished Surface | Ground Surface |
| Control | 67.7 | 35.3 |
| 900 | 61.2 | 12.7 |
| 1100 | 76.4 | 12.7 |
| 1200 | 50.1 | ND* |
| 1300 | 72.9 | ND |
| 1400 | 64.2 | 1.4 |
| 1500 | 63.9 | 28.4 |

*ND = not detectable

EXAMPLE 2

Figure 2:
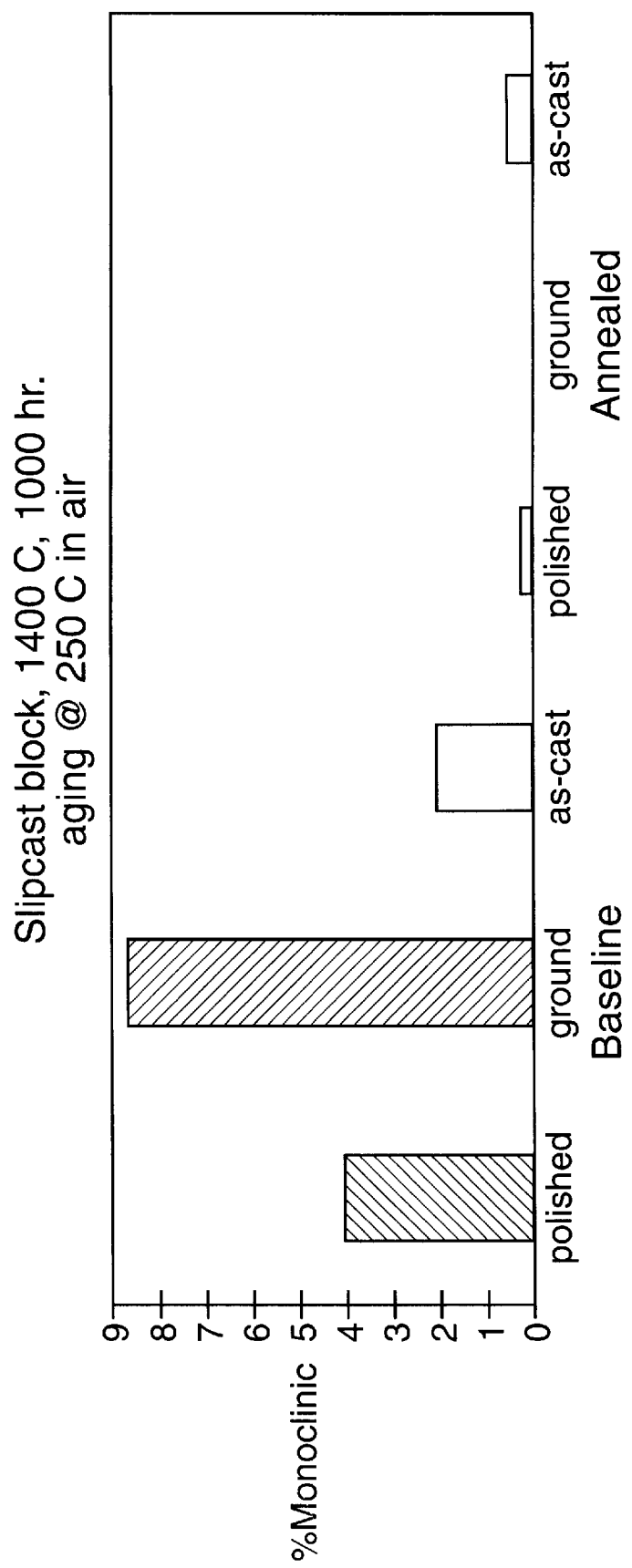
FIG. 2 is a graph showing effect of heat treatment on several slipcast blocks, sintered at 1400° C.

2314.27 g. of HSY-3 zirconia powder and 384.74 g. of Alcan C-901 alumina powder were weighed in a 1.6 gallon Abbethane ball-mill jar. 10.6 kg of ⅜" zirconia media was added. A mixture was made by weighing off 889.2 g. of deionized water, 10.8 g. of Darvan 821A ammonium polyacrylate (40 % solution Vanderbilt Laboratories) and 17.5 g. of TMA (25 wt. % solution, Alfa Inorganics). The slip was ball-milled for 24 hrs. and blocks were pressure slipcast. After drying, the blocks were densified under three different temperatures, 1325° C., 1350° C., and 1400° C. All blocks reached full density, 5.62 g/cm³. Samples were cut from the blocks and surface treated and subsequently aged at 250° C. for 1000 hrs. Other samples were surface treated similarly but were subsequently heat treated at 1250° C. for 1 hr., and then aged for 1000 hrs. at 250° C. The percent monoclinic is shown in FIG. 1. The percent transformation in the samples without heat treatment increased with the sintering temperature showing the effect of the microstructrure on the aging process. After annealing, all samples showed significant reduction in transformation upon aging. FIG. 2 shows the effect of the heat treatment on the slipcast block. From FIG. 2, it is clear that with the annealing treatment, the surface treatment does not have much of an effect.

EXAMPLE 3

2314.27 g. of HSY-3 zirconia powder and 384.74 g. of Alcan C-901 alumina powder were weighed in a 1.6 gallon Abbethane ball-mill jar. 10.6 kg of ⅜" zirconia media was added. A mixture was made by weighing off 889.2 g. of deionized water, 10.8 g. of Darvan 821A ammonium polyacrylate (40 % solution Vanderbilt Laboratories) and 17.5 g. of TMA (25 wt. % solution, Alfa Inorganics). The slip was ball-milled for 24 hrs. and 3200 g. was recovered and transferred to a sigma mixer. During agitation in the sigma mixer, 72 g. of Agar (S-100, Frutarom Meer Corp.), 0.62 g. methyl-p-hydroxy benzoate (Penta Mfg) and 0.45 g. propyl-p-hydroxy benzoate (Penta Mfg.) were added incrementally. The sigma mixer was heated to 190° F. for 45 min, after which the temperature was reduced to 170° F. and mixing continued for another 45 min. After the material was allowed to cool to room temperature, it was shredded using a food processor (Kitchen Aid KSM90) and sieved using a #5 sieve to remove any large and fine shards.

Figure 3:
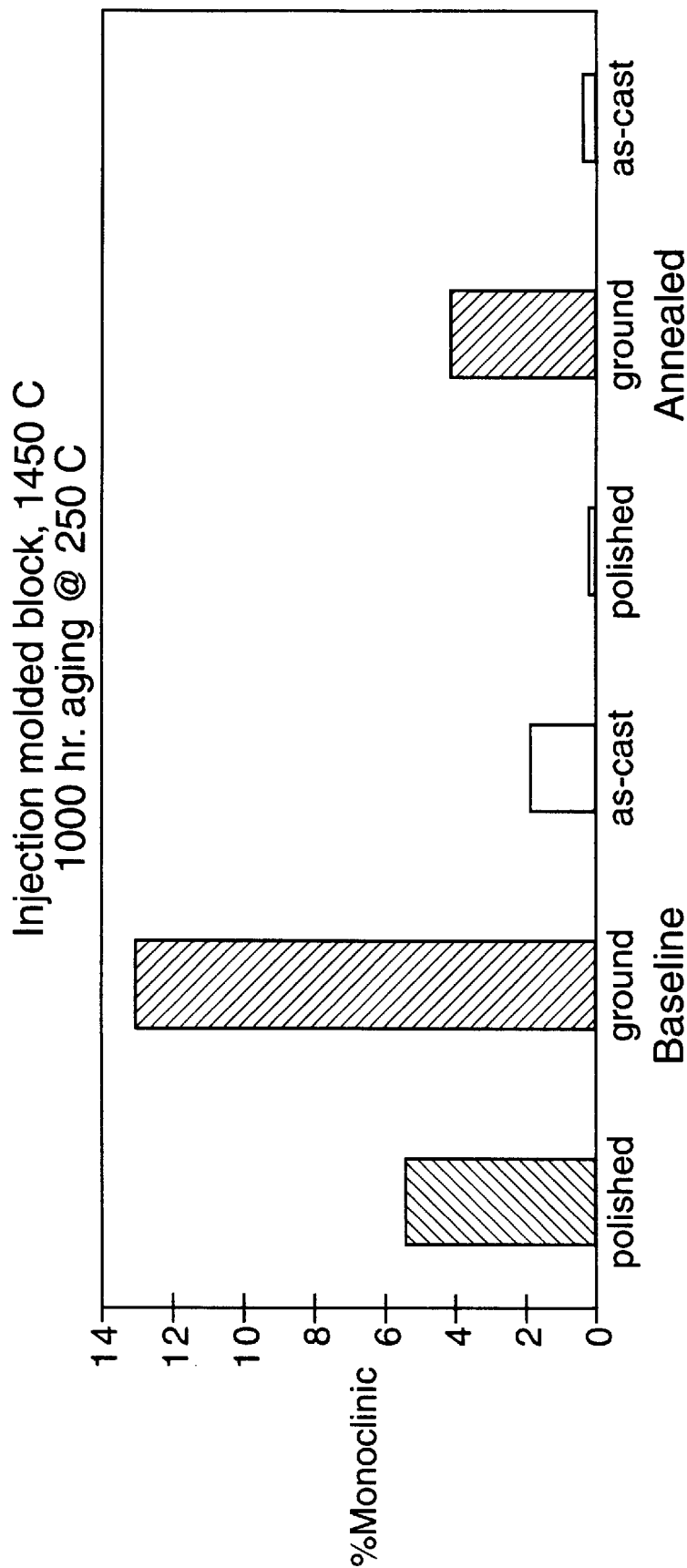
FIG. 3 is a graph showing the effect of heat treatment on several injection molded blocks sintered at 1450° C.

Before being injection molded, the shredded feed-stock was dried to a desired solids level by exposing a loose bed of material to the atmosphere. Solids loadings were determined using a moisture balance (Ohaus Corp.). Plates were molded on both a Boy 15s and 22M. The plates were dried slowly on the bench for several hours after which they were dried in a vacuum oven at 100° C. After the plates were dry, they were densified at 1450° C. for 2 hrs. Samples were cut from the blocks and surface treated and subsequently aged at 250° C. for 1000 hrs. Other samples were surface treated similarly, but were subsequently heat treated at 1250° C. for 1 hr., and then aged for 1000 hrs. at 250° C. The percent monoclinic is shown in FIG. 3. Referring to FIG. 3, is clear that the annealing treatment significantly reduces the effect of aging, and that surface finish does not play a large role.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A process for preparing an alumina-containing ceramic body having a surface region containing tetragonal zirconia, partially stabilized with yttria, consisting of the steps of:

(a) sintering said body to at least 95% theoretical density at a temperature below about 1550° C.; and (b) heat treating said surface region to reverse local stresses therein.

2. A process as recited in claim 1, in which said ceramic body has a composition consisting essentially of 2–3 mol. % yttria, 0–6 wt. % ceria, and 5–40 wt. % alumina, the balance being zirconia plus incidental impurities.

3. A process as recited in claim 1, wherein said heat treating step comprises the steps of:

(a) heating said body to a temperature ranging from about 1000–1400° C., said heating step being carried out at a heating rate ranging from about 100–500° C./hr; and (b) maintaining said temperature within said temperature range for a time ranging from about 0.5–3 hrs.; and (c) cooling said body to room temperature at a cooling rate ranging from about 200 to 600° C./hr.

* * * * *